US009230516B2

(12) United States Patent  (10) Patent No.: US 9,230,516 B2
Tanaka  (45) Date of Patent: Jan. 5, 2016

(54) AUTOMATIC SCROLLING SPEED CONTROL BY TRACKING USER'S EYE (75) Inventor: Kensaku Tanaka, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 116 days.

(21) Appl. No.: 13/397,739

(22) Filed: Feb. 16, 2012

(65) Prior Publication Data

US 2012/0212407 A1 Aug. 23, 2012

(30) Foreign Application Priority Data

Feb. 18, 2011 (JP) ................. 2011-033450

(51) Int. Cl.
G06F 3/0485 (2013.01)
G06F 3/01 (2006.01)
G09G 5/34 (2006.01)

(52) U.S. Cl.
CPC .......... G09G 5/34 (2013.01); G06F 3/013 (2013.01); G06F 3/0485 (2013.01); G09G 2320/0261 (2013.01)

(58) Field of Classification Search
CPC ...................................................... G06F 3/013
USPC ........................................................ 715/785
See application file for complete search history.

(56) References Cited

U.S. PATENT DOCUMENTS 6,330,009 B1* 12/2001 Murasaki et al. ............. 715/784
6,421,064 B1* 7/2002 Lemelson et al. ............ 345/688
8,970,452 B2* 3/2015 Wheeler et al. ................. 345/8
2001/0008404 A1* 7/2001 Naito et al. ................... 345/745
2002/0180799 A1* 12/2002 Peck et al. .................... 345/784
2005/0108092 A1* 5/2005 Campbell et al. .............. 705/14
2007/0052689 A1* 3/2007 Tak .............................. 345/173
2007/0164990 A1* 7/2007 Bjorklund et al. ............ 345/156
2010/0138154 A1* 6/2010 Kon et al. ..................... 701/212
2010/0169825 A1* 7/2010 Krause .......................... 715/784
2012/0146895 A1* 6/2012 Bjorklund et al. ............ 345/156

FOREIGN PATENT DOCUMENTS

JP 9185116 A 7/1997
JP 10210524 A 8/1998
JP 2008193535 A 8/2008

OTHER PUBLICATIONS

Office Action mailed Jun. 24, 2014, corresponds to Japanese patent application No. 2011-033450.

* cited by examiner

Primary Examiner — William Boddie
Assistant Examiner — Bipin Gyawali
(74) Attorney, Agent, or Firm — Hauptman Ham, LLP (57) ABSTRACT According to an aspect, an information display device includes a display unit, a visual line detector, and a control unit. The display unit displays information in a scroll region, which is provided in at least a part of a screen of the display unit, while scrolling the information. The visual line detector detects a visual line position of an operator with respect to the scroll region. The control unit controls a scroll speed, at which the information is scrolled in the scroll region, based on the visual line position detected by the visual line detector.

20 Claims, 6 Drawing Sheets

| CONDITION | SETTING |
|---|---|
| MORNING | NO CHANGE |
| AFTERNOON | DECELERATE BY 10 % |
| KATAKANA CHARACTER RATIO OF 0 % TO 20 % | DECELERATE BY 5 % |
| KATAKANA CHARACTER RATIO OF 20 % TO 40 % | DECELERATE BY 10 % |
| ⋮ | ⋮ |

AUTOMATIC SCROLLING SPEED CONTROL BY TRACKING USER'S EYE

CROSS-REFERENCE TO RELATED APPLICATIONS

This application claims priority from Japanese Application No. 2011-033450, filed on Feb. 18, 2011, the content of which is incorporated by reference herein in its entirety.

BACKGROUND

1. Technical Field

The present disclosure relates to an information display device that displays an image including characters, signs, and the like.

2. Description of the Related Art

With the progressing information society, information display devices, such as a mobile phone, which include a display unit, quickly become widespread, and users of a wide age group use the information display devices. There is a display method for scrolling information in one direction as a method for displaying an image of the information display device. Japanese Patent Application Laid-Open No. 2008-193535 discloses a device that sets a scroll speed based on what operation for another function is made by a user when the information is displayed while scrolled.

Because a speed at which the user reads and recognizes the information depends on the user, the displayed information can easily read by adjusting the scroll speed (display feed speed) like the device disclosed in JP-A No. 2008-193535.

However, the speed at which the user reads and recognizes the information depends on the information displaying method. The speed also changes according to the amount of displayed information or a state in which the user reads the information. Therefore, sometimes the proper display speed is not obtained even if the information is scrolled at the scroll speed calculated based on an operation speed of an input by a user in other functions, such as a mail function and a browser function. In the case of the improper scroll speed, the user hardly reads and recognizes the displayed information.

For the foregoing reasons, there is a need for an information display device and a scroll control method that allow a user to read and recognize the displayed information easily.

SUMMARY OF THE INVENTION

According to an aspect, an information display device includes a display unit, a visual line detector, and a control unit. The display unit displays information in a scroll region, which is provided in at least a part of a screen of the display unit, while scrolling the information. The visual line detector detects a visual line position of an operator with respect to the scroll region. The control unit controls a scroll speed, at which the information is scrolled in the scroll region, based on the visual line position detected by the visual line detector.

According to another aspect, a scroll control method is executed by a device that includes a display unit for displaying information, and a detector for detecting a visual line position of an operator. The scroll control method includes: scrolling information in a scroll region of the display unit; detecting the visual line position with respect to the scroll region by the detector; and controlling a scroll speed, at which the information is scrolled in the scroll region, based on the visual line position detected by the visual line detector.

DETAILED DESCRIPTION

The present invention will be described in detail with reference to the drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the information display device, however, the present invention is not limited to mobile phones. Therefore, the present invention can be applied to various types of devices, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
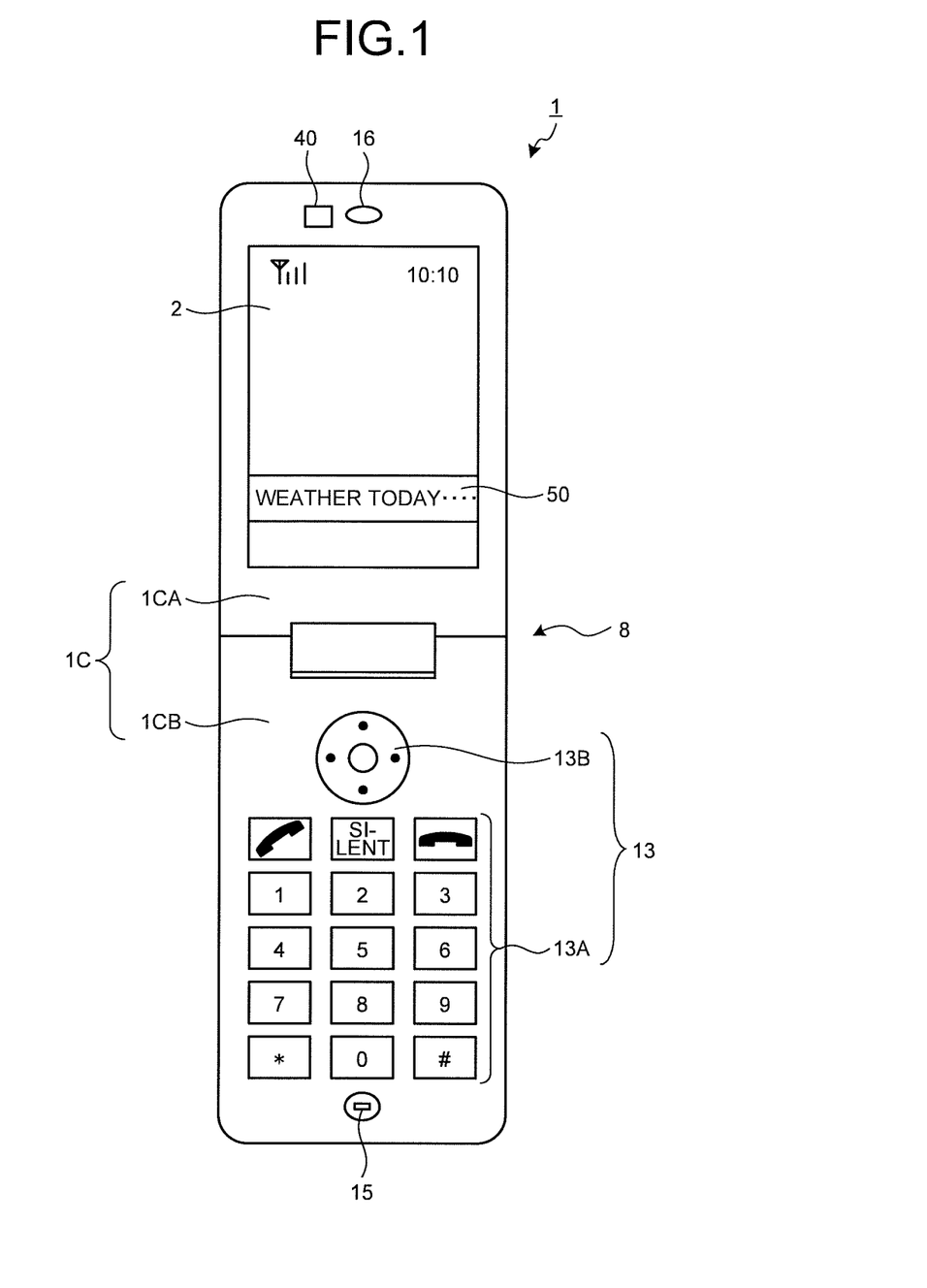
FIG. 1 is a front view of an information display device according to an embodiment.
Figure 2:
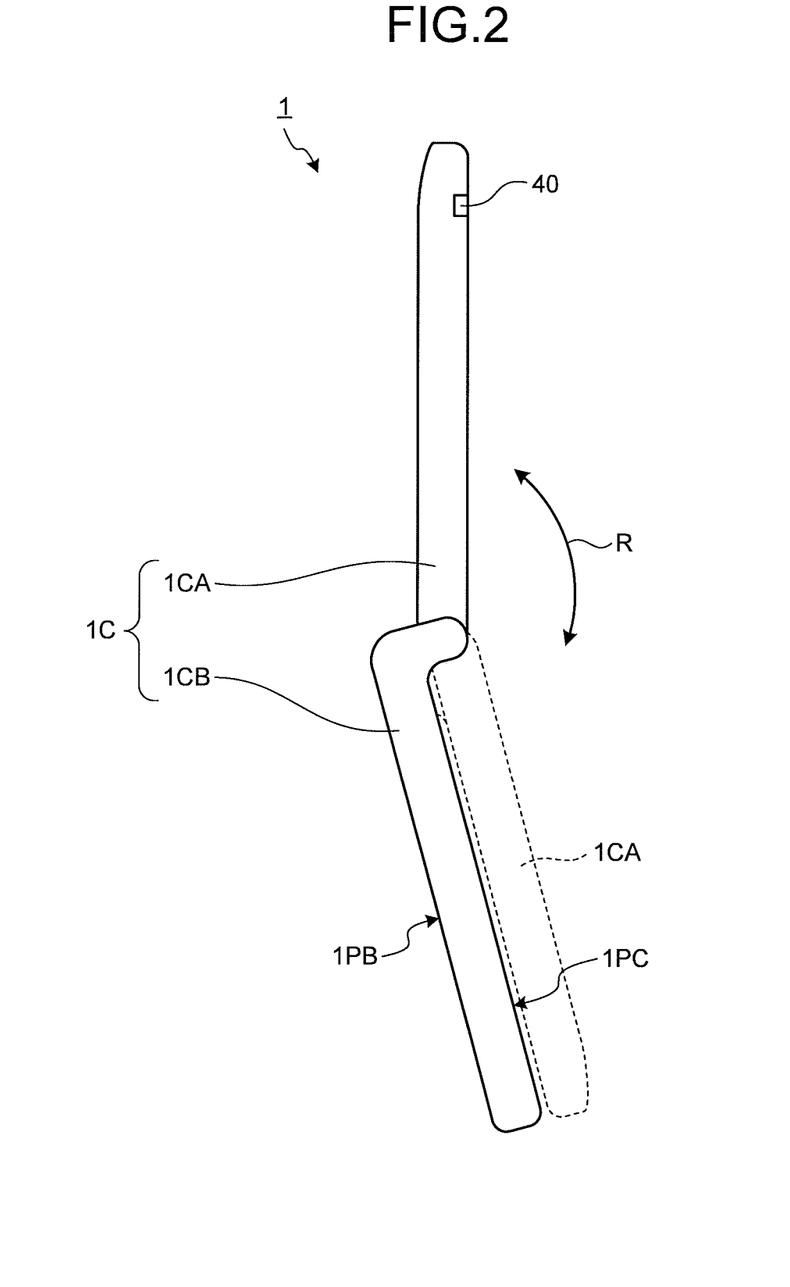
FIG. 2 is a side view of the information display device.

FIG. 1 is a front view of an information display device according to an embodiment of the invention, and FIG. 2 is a side view of the information display device. The information display device 1 of FIGS. 1 and 2 is a mobile phone that includes a radio communication function, output means, sound acquiring means, and imaging means. In the information display device 1, a housing 10 is formed with plural housing. Specifically, the housing 10 is formed with a first housing 1CA and a second housing 1CB while being configured openable and closable. That is, the information display device 1 has a fold type housing. The housing of the information display device 1 is not limited to the structure of FIGS. 1 and 2. For example, the housing of the information display device 1 may be a slide type housing in which one of housing and the other housing can slide on each other from a state in which both the housing overlap each other, a rotation type housing in which one of housing is rotated about a shaft line along an overlapping direction, or a housing in which both the housing are coupled to each other through a biaxial hinge.

The first housing 1CA and the second housing 1CB are coupled by a hinge mechanism 8 that is a coupling unit. The first housing 1CA and the second housing 1CB are coupled by the hinge mechanism 8, so that the first housing 1CA and the second housing 1CB are configured to be able to turn about the hinge mechanism 8 in a direction in which the first housing 1CA and the second housing 1CB are distanced from each other and a direction in which the first housing 1CA and the second housing 1CB are brought close to each other (direction indicated by an arrow R of FIG. 2). The information display device 1 is opened when the first housing 1CA and the second housing 1CB turn in the direction in which the first housing 1CA and the second housing 1CB are distanced from each other, and the information display device 1 is closed to put into a folded state (state indicated by a dotted line of FIG. 2) when the first housing 1CA and the second housing 1CB are turn in the direction in which the first housing 1CA and the second housing 1CB are brought close to each other.

A display 2 of FIG. 1 is provided as a display unit in the first housing 1CA. The display 2 displays a standby image when the information display device 1 is in a standby state, or displays a menu image that is used to assist an operation of the information display device 1. FIG. 1 illustrates a state in which the information display device 1 displays information (telop) in a scroll region 50 of the display 2 while scrolling the information. The scroll region 50 is described later. The display 2 (display unit 32) includes a scroll region, where the above-described information can be displayed while scrolled in one direction, in at least a part of the screen. A receiver 16, that is the output means for outputting sound in telephone call in the information display device 1, is provided in the first housing 1CA.

A camera 40 that captures an image is provided in a surface on which the display 2 of the first housing 1CA is disposed. The camera 40 can capture the image in a region facing the display 2 (a region opposed to the display 2).

In the second housing 1CB, plural operation keys 13A are provided in order to input a telephone number of a calling party and characters in composing an e-mail message. A direction and decision key 13B is provided in order to easily select and decide a menu displayed on the display 2 or to easily scroll the screen. The operation keys 13A and the direction and decision key 13B constitute an operation unit 13 of the information display device 1. A microphone 15 that is the sound acquiring means for receiving the sound in the telephone call with the information display device 1 is provided in the second housing 1CB. The operation unit 13 is provided in an operation surface 1PC of the second housing 1CB as illustrated in FIG. 2. A back surface 1PB of the information display device 1 is located on the opposite side to the operation surface 1PC.

Figure 3:
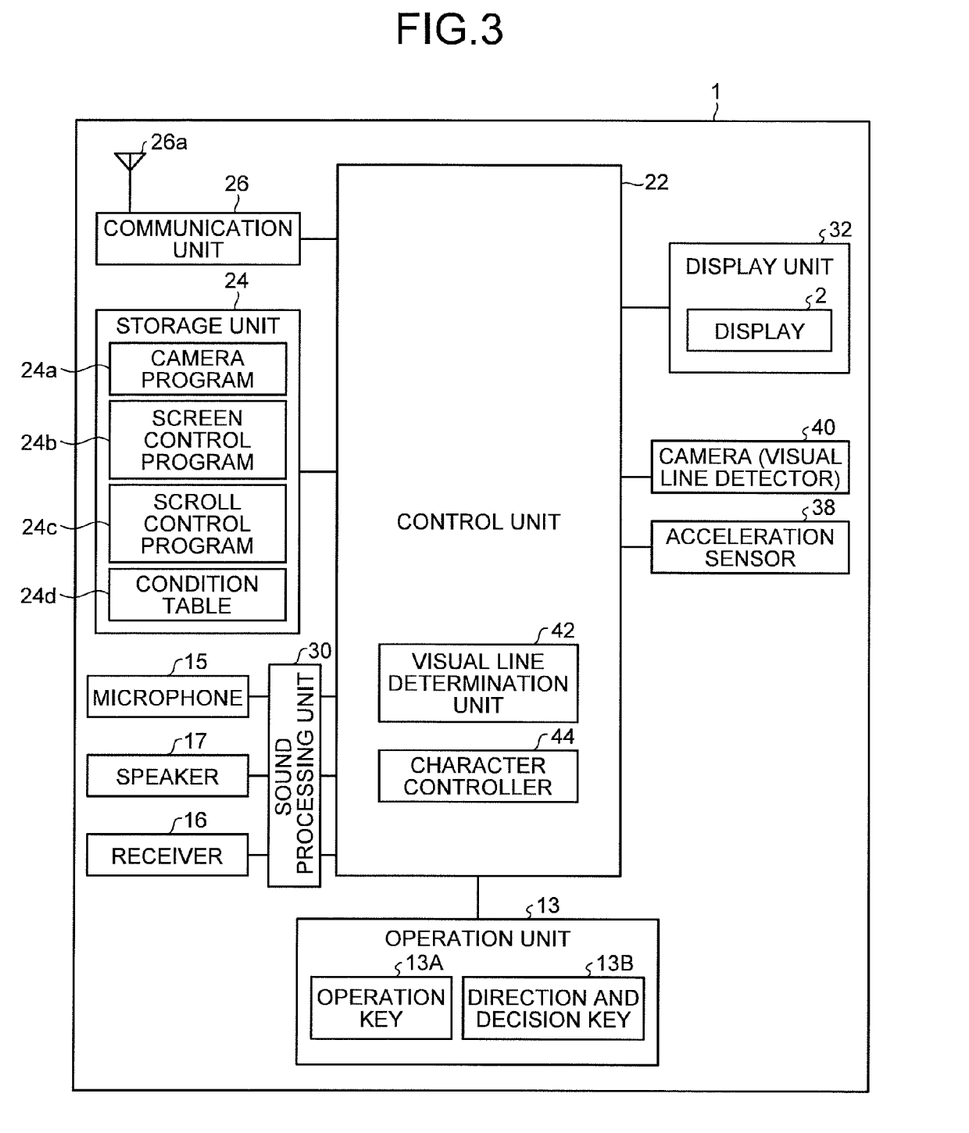
FIG. 3 is a block diagram of the information display device.

FIG. 3 is a block diagram of the information display device 1. As illustrated in FIG. 3, the information display device 1 includes a control unit 22, a storage unit 24, a communication unit 26, the operation unit 13, a sound processing unit 30, a display unit 32, an acceleration sensor 38 that is movement detection means, and the camera 40. The control unit 22 has a function of integrally controlling the operation of the information display device 1. That is, the control unit 22 controls the operations of the communication unit 26, the sound processing unit 30, the display unit 32, and the like such that various pieces of processing of the information display device 1 are executed in a proper procedure according to the operation of the operation unit 13 or software stored in the storage unit 24 of the information display device 1. The control unit 22 includes a visual line determination unit 42 and a character controller 44.

Examples of various pieces of processing of the information display device 1 include verbal communication conducted through a switched circuit network, composition and transmission/reception of an e-mail message, and browsing of a Web (World Wide Web) of the Internet. Examples of the operations of the communication unit 26, the sound processing unit 30, and the display unit 32 include signal transmission/reception executed by the communication unit 26, sound input/output executed by the sound processing unit 30, and image display executed by the display unit 32.

The control unit 22 executes processing based on program(s) (such as an operating system program and an application program) stored in the storage unit 24. For example, the control unit 22 includes a Micro Processing Unit (MPU) to execute various pieces of processing of the information display device 1 according to the procedure instructed by the software. That is, the control unit 22 executes the processing by sequentially reading a command code from the operating system program and the application program which are stored in the storage unit 24.

The control unit 22 has a function of executing the plural application programs. Examples of the application programs executed by the control unit 22 include a camera program 24a, a screen control program 24b, a scroll control program 24c, a mail program for implementing an electronic mail function, and a browser program for implementing WEB browsing application. The visual line determination unit 42 and the character controller 44 of the control unit 22 execute the processing based on various programs. Each of the visual line determination unit 42 and the character controller 44 may store a specific program therein, or the visual line determination unit 42 and the character controller 44 may read and execute program(s) stored in the storage unit 24.

The program and data, which are used in the processing executed by the control unit 22, are stored in the storage unit 24. Specifically, the camera program 24a that controls an imaging operation of the camera 40, the screen control program 24b for implementing the screen control, the scroll control program 24c for implementing the scroll display, and a condition table 24d in which conditions that is used as criteria to set a scroll speed in executing the scroll display is defined are stored in the storage unit 24. Additionally, the operating system program for implementing a basic function of the information display device 1 and other programs and pieces of data such as an address book data, in which names, telephone numbers, and e-mail addresses are registered, are also stored in the storage unit 24.

A computer program and temporary data, which are used in a software processing process, are temporarily stored in a work area allocated to the storage unit 24 by the control unit 22. The storage unit 24 includes one or more non-transitory storage medium, for example, a nonvolatile memory (such as ROM, EPROM, flash card etc.) and/or a storage device (such as magnetic storage device, optical storage device, solid-state storage device etc.). The storage unit 24 may include one or more storage devices used as temporary storage area (for example, a SRAM (Static Random Access Memory) and a DRAM (Dynamic Random Access Memory)).

The communication unit 26 includes an antenna 26a. The communication unit 26 establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26. The operation unit 13 includes the operation key 13A and the direction and decision key 13B. The operation key 13A includes various keys such as a power key, a telephone call key, a numerical key, a character key, a direction key, a decision key, and an outgoing call key, to each of which a certain function is allocated. When the key is input by a user's operation, a signal corresponding to the operation is generated. The generated signal is input to the control unit 22 as the user's instruction.

The sound processing unit 30 executes processing to a sound signal input to a microphone 15 and a sound signal output from the receiver 16 or the speaker 17. The sound processing unit 30 amplifies the sound input from the microphone 15 and executes an AD conversion (analog-digital conversion). Then the sound processing unit 30 executes signal processing such as coding, converts the sound into digital sound data, and transmits the sound data to the control unit 22. The sound processing unit 30 executes pieces of processing such as decoding, DA conversion (digital-analog conversion), and amplification to the sound data transmitted from the control unit 22, converts the sound data into an analog sound signal after applying processing such as amplification, and transmits the sound signal to the receiver 16 and the speaker 17. The speaker 17 is disposed in the housing 1C of the information display device 1, and outputs a ringtone, a mail transmission sound, and so on.

The acceleration sensor 38 detects a direction and magnitude of an acceleration applied to the information display device 1. A detection result of the acceleration sensor 38 is used to determine an attitude change of the information display device 1 or the existence or non-existence of the movement, or to calculate an amount of change of the attitude or a movement distance. Alternatively, a direction sensor may be provided in the information display device 1 in order to determine the existence or non-existence of the attitude change of the information display device 1 or to calculate the amount of change of the attitude.

The display unit 32 includes the display 2. The display unit 32 displays a video image corresponding to video data supplied from the control unit 22 or an image corresponding to the image data. For example, the display 2 is constructed by a display panel, such as a Liquid Crystal Display (LCD) panel and an Organic Electro-Luminescence Display (OELD). The display unit 32 may include a sub-display in addition to the display 2.

The camera (visual line detector) 40 is an imaging system that captures the image in the region facing the display 2. That is, the camera 40 captures the image in a direction in which the display 2 emits light.

Figure 4:
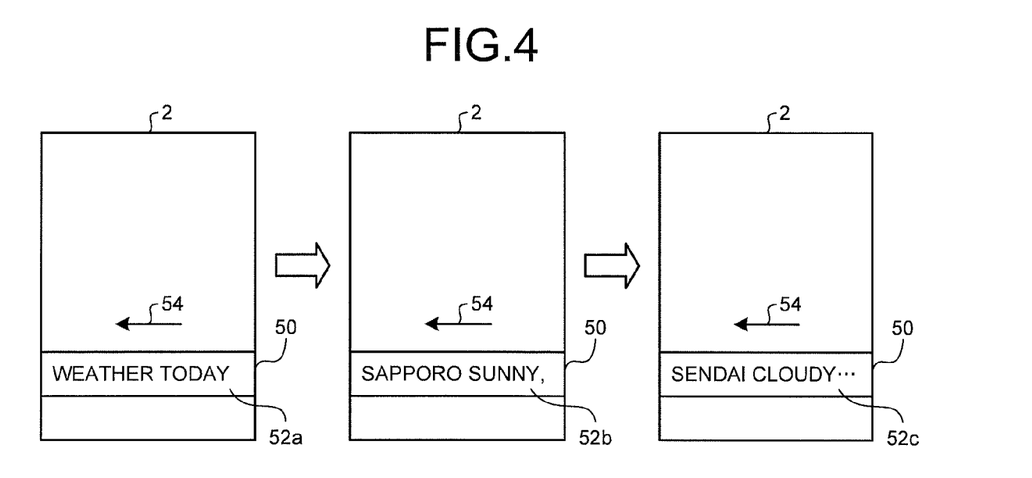
FIG. 4 is an explanatory view illustrating an example of an image displayed by the information display device.
Figure 5:
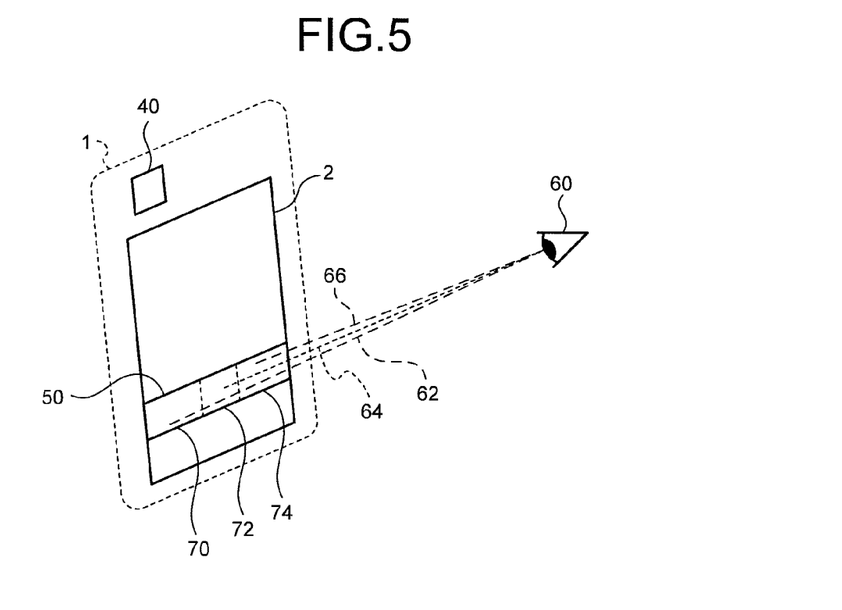
FIG. 5 is an explanatory view illustrating a relationship between the information display device and a visual line of a user.
Figure 6:
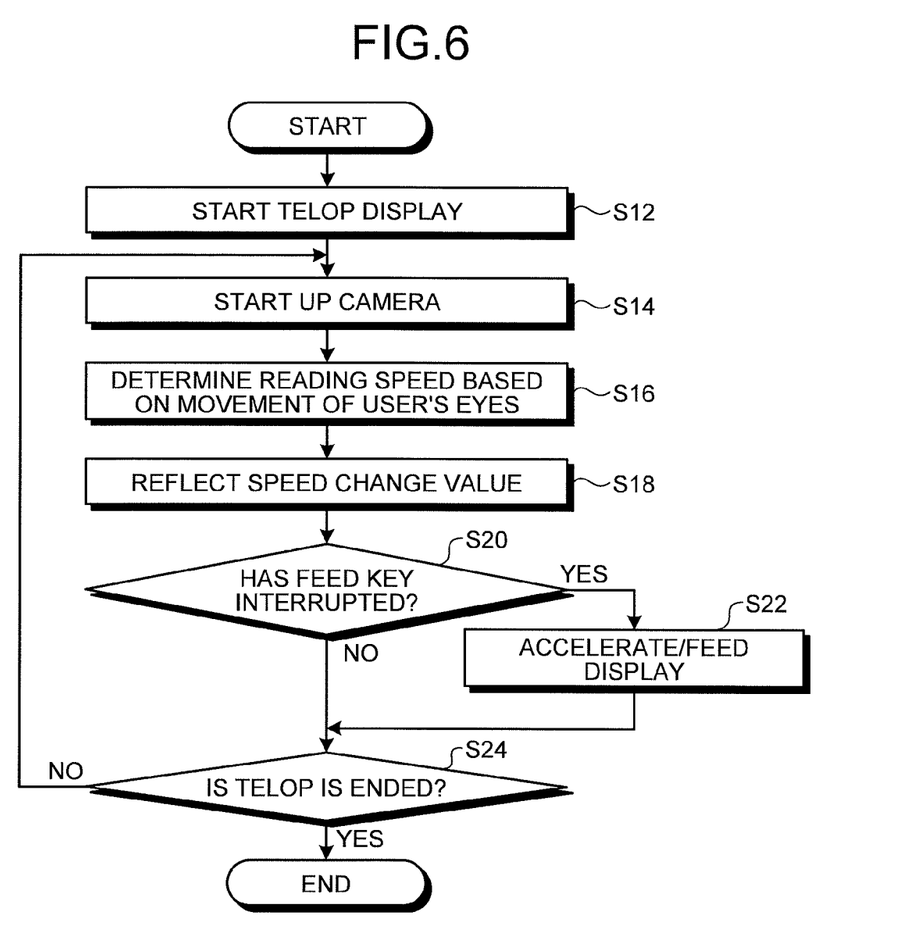
FIG. 6 is a flowchart illustrating an example of processing of the information display device.

Next, an example of the processing of the information display device 1 will be described with reference to FIGS. 4 to 6. FIG. 4 is an explanatory view illustrating an example of the image displayed by the information display device 1. FIG. 5 is an explanatory view illustrating a relationship between the information display device 1 and the visual line of the user. FIG. 6 is a flowchart illustrating an example of the processing of the information display device 1. The following processing of the information display device 1 is executed such that the camera program 24a, the screen control program 24b, and the scroll control program 24c, which are stored in the storage unit 24, are read by the control unit 22 and such that control unit 22 executes the application programs.

The information display device 1 includes the visual line detector (camera) 40 that detects a visual line position of an operator (user) with respect to a scroll region and the control unit 22 that controls a scroll speed at which the information is scrolled in the scroll region based on the detected visual line position. In the information display device 1, the control unit 22 processes the scroll control program 24c, whereby pieces of information 52a, 52b, and 52c are displayed in a scroll region of the display 2 while (a telop is) scrolled as illustrated in FIG. 4. "Telop" means scrolled information. The scroll region 50 occupies at least a part of the region where the screen of the display 2 is displayed. In FIG. 4, the scroll region 50 is a partial region in a lower portion of the screen (character display direction) of the display 2. In the example of FIG. 4, information that "Weather today, Sapporo sunny, Aomori, . . . , Sendai cloudy, . . . " is scroll-displayed in the scroll region 50. Various pieces information including the characters and the signs can be used as the information displayed in the scroll region 50. As illustrated in FIG. 4, the control unit 22 moves the information to be displayed in the scroll region 50 in a scroll direction (a predetermined one direction, and a direction of an arrow 54) at the set scroll speed. A scroll speed setting method is described later. Thus, the scroll region 50 is put into the state in which the information 52b is displayed when a predetermined time elapses since the information 52a is displayed, and then the scroll region 50 is put into the state in which the information 52c is displayed when the predetermined time further elapses.

The information display device 1 causes the control unit 22 to process the camera program 24a and the scroll control program 24c, whereby the camera (visual line detector) 40 detects the visual line position with respect to user's eyes 60 in the scroll region 50 while the information is displayed in the scroll region 50, as illustrated in FIG. 5.

The control unit 22 of the information display device 1 acquires the image in the region facing the display 2 with the camera 40, and extracts the image of the user's eyes 60 from the acquired image. The information display device 1 of the present embodiment detects the visual line position of the user's eyes 60 from the image of the user's eyes 60. Specifically, the scroll region 50 is divided into a first region 70, a second region 72, and a third region 74, and the visual line determination unit 42 of the control unit 22 determines which one of the three regions the visual line position exists in, namely, which one of the three regions the user's eyes 60 view. That is, the range where the camera (visual line detector) 40 can detect the visual line is divided into plural blocks, and the visual line determination unit 42 determines which block the detected visual line position is located in. The first region 70 is located on a leading end side of an arrow 54, namely, a region on an ending position side of the scroll display of the information. The second region 72 is located in the center of the scroll region 50. The third region 74 is located on an end side of the arrow 54, namely, a region on a starting position side of the scroll display of the information. That is, the information displayed in the scroll region 50 passes in the order of the third region 74, the second region 72, and the first region 70. The control unit 22 analyzes the user's eyes 60, and determines that the visual line position exists in the first region 70 when it is determined that the visual line is a visual line 62. The control unit 22 analyzes the user's eyes 60, and determines that the visual line position exists in the second region 72 when it is determined that the visual line is a visual line 64. The control unit 22 analyzes the user's eyes 60, and determines that the visual line position exists in the third region 74 when it is determined that the visual line is a visual line 66. Various methods can be adopted as the method for detecting the visual line position based on the image captured by the camera 40. For example, the visual line position can be detected by analyzing an orientation of a pupil of the image of the user's eyes 60.

Processing of the scroll display of the information (telop) in scroll region 50 while adjusting the scroll speed will be described below with reference to FIG. 6. The processing of FIG. 6 is executed such that the processing is executed as needed basis by the application executed by the camera program 24a and the application executed by the screen control program 24b while the whole processing is executed by the application executed by the scroll control program 24c. At Step S12, the control unit 22 starts the telop display. That is, the control unit 22 displays the information in the scroll region 50 while scrolling the information.

After starting the telop display at Step S12, the control unit 22 starts up the camera 40 at Step S14. After starting up the camera 40 at Step S14, the control unit 22 determines a reading speed based on the movement of the user's eyes at Step S16. That is, the control unit 22 detects the user's eyes with the started-up camera 40 to determine the visual line position. Following the detection of the visual line position, the control unit 22 calculates the proper scroll speed based on the visual line position in the scroll region 50. The scroll speed determination method is described later. The calculated scroll speed and the current scroll speed are compared, and a speed change value is calculated based on a difference of the comparison result.

When the reading speed has been determined at Step S16, the control unit 22 reflects the speed change value at Step S18. That is, the scroll speed is adjusted based on the determination result at Step S16. In the case where the current scroll speed is proper, the scroll speed is not changed.

After reflecting the speed change value at Step S18, the control unit 22 determines whether the feed key has interrupted at Step S20. The feed key is a key to which an instruction to feed the information to be displayed in the scroll region 50 by a certain amount or an instruction to accelerate the scroll speed is allocated. The user operates the feed key, when he/she determines that necessity to read the information displayed in the scroll region 50 is eliminated, or when the user wants to know the information after the information displayed in the scroll region 50.

When it is determined that the feed key has interrupted, namely, the feed key is operated at Step S20 (Yes), the control unit 22 accelerates the scroll speed or feeds the information displayed in the scroll region 50 by a certain amount (a certain length) at Step S22. Therefore, the control unit 22 can display the information after the displayed information in the scroll region 50 with a higher speed. The control unit 22 goes to processing at Step S24 after executing the processing at Step S22.

When it is determined that the feed key has not interrupted, namely, the feed key is not operated at Step S20 (No), the control unit 22 goes to processing at Step S24. The control unit 22 determines whether the telop is ended at Step S24 after it is determined to be No at Step S20 or the processing at Step S22 is ended. When it is determined that the telop is not ended at Step S24 (No), the control unit 22 goes to processing at Step S14 to repeat the above pieces of processing. When it is determined that the telop is ended at Step S24 (Yes), the control unit 22 ends the processing.

The information display device 1 analyzes the image captured with the camera 40 to detect where in the scroll region 50 the user views, namely, to detect the visual line position, and adjust the scroll speed based on the visual line position, thereby allowing the user to easily read and recognize the information displayed in the scroll region 50. Even a slow reader who is not good at reading the information of the scroll display, for example, an old person hardly misses the information of the scroll display and has to wait for the information to be displayed again because the scroll speed can be adjusted according to the visual line position of the person. Because the scroll speed is automatically adjusted based on the result detected by the camera 40, it is not necessary for the user to perform the troublesome operation such as the setting.

As illustrated in FIG. 6, the visual line position is detected while displaying the telop, and the scroll speed is repeatedly adjusted, so that the scroll speed can be adjusted to a speed appropriate for the displayed information. That is, the scroll speed can be adjusted to a slower speed in the case where the information being hard to read for the user is displayed, and the scroll speed can be adjusted to a faster speed in the case where the information being easy to read for the user is displayed.

The control unit 22 may adjust the scroll speed based on the visual line position in the direction parallel to the scroll direction. That is the direction parallel to the information moving direction is taken into account while it is not necessary to take into account the position in the direction orthogonal to the information moving direction. The control unit 22 may neglect the detection result in which the visual line position is out of the scroll region 50. While the visual line position is out of the scroll region 50, the scroll speed may be set to 0 such that the displayed information is not moved.

Various methods can be adopted as the method for calculating the speed change value based on the visual line position, namely, the method for adjusting the scroll speed. Preferably, the camera (visual line detector) 40 of the information display device 1 detects the visual line position at set intervals, and the control unit 22 scrolls the information at the scroll speed, at which the visual line position is maintained within a certain region, based on the visual line position detected plural times. That is, preferably the control unit 22 calculates the scroll speed, at which the visual line position can be maintained within the same region, based on the visual line position detection results of the plural times, and the control unit 22 scrolls the information at the calculated scroll speed. Because the visual line position can be maintained within the certain region, the user can read and recognize the information while continuously viewing the substantially same region in the scroll region 50. Preferably the control unit 22 maintains the visual line position in the central region (second region 72 in FIG. 5) in the scroll region 50. That is, preferably the visual line position is maintained in the central region of the scroll region, as the certain region. Thus, a given margin can be provided in front and at the back of the visual line position in the scroll direction so that the information can be recognized even if the visual line position is moved in the front-back direction of the scroll direction.

Preferably the control unit 22 sets a permitted region to a part of the scroll region, the scroll speed of the information is accelerated when the visual line position is located closer to a scroll display starting position side than the permitted region, and the scroll speed of the information is decelerated when the visual line position is located closer to a scroll display ending position side than the permitted region. Specifically, in FIG. 5, preferably the second region 72 is set to the permitted region, the scroll speed of the information is decelerated when the visual line position is located in the first region 70, and the scroll speed of the information is accelerated when the visual line position is located in the third region 74. Therefore, the visual line position of the user can be maintained in the permitted region.

Preferably, as in the present embodiment, the control unit 22 divides a range where the camera (visual line detector) 40 can detect the visual line into plural blocks, the visual line determination unit 42 determines which block the visual line position detected by the camera (visual line detector) 40 is located in, and the control unit 22 controls the scroll speed based on the position of the block including the determined visual line position. The control program or the processor (visual line determination unit 42) that determines which block the visual line position is located in may not be provided in the control unit 22, but may separately be provided. Thus, the scroll region is divided into plural blocks, thereby allowing the scroll speed to be more easily controlled based on the visual line position. In the above-described embodiment, the scroll region is divided into three regions. However, there is no particular limitation to the number of divided regions. For example, the scroll region may be divided into 4 or 10 regions.

The visual line position is detected while displaying the information in the scroll region and the scroll speed is immediately adjusted based on the detection result, as in the above-described embodiment, thereby making the information currently displayed more readable. Preferably the information display device 1 adjusts the scroll speed in real time. However, the manner to adjust the scroll speed is not limited thereto. For example, the information display device 1 may scroll sample information in a constant direction in the scroll region 50 while causing the camera 40 to detect the visual line position, thereby determining a reference scroll speed based on the visual line position of the operator with respect to the sample information. In this case, the scroll speed may be set to the reference scroll speed at the beginning of displaying the information in the scroll region. The scroll speed suitable for the user is previously calculated using the sample information, and the scroll speed is adjusted based on the actual visual line position, whereby the information can be displayed in the scroll region 50 in a manner where the user easily reads and recognizes the information.

In the above-described embodiment, the operation of the feed key is detected at Step S20. However, the scroll adjusting instruction that can be input by the user is not limited to thereto. For example, operation instructions, such as fast-forwarding, pausing, and rewinding, may be allocated to the key of the operation unit 13. Similarly to the feed key, the control unit 22 may control the display of the scroll region 50, based on the input instruction.

Figure 7:
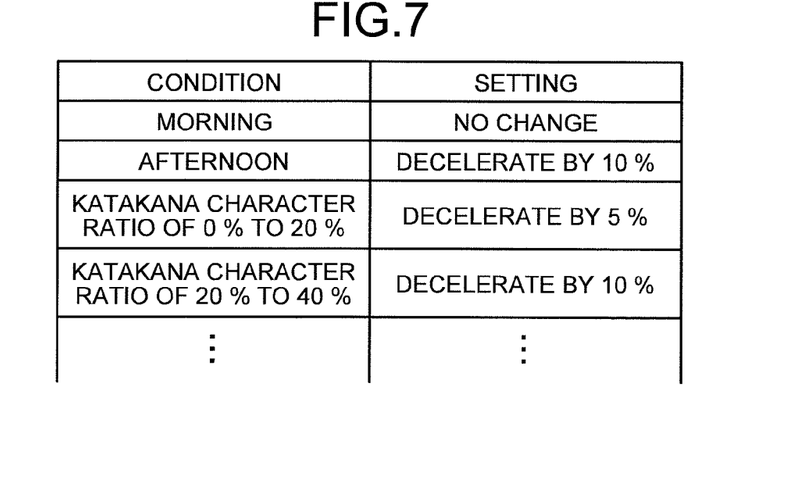
FIG. 7 is an explanatory view illustrating an example of information stored in a condition table.
Figure 8:
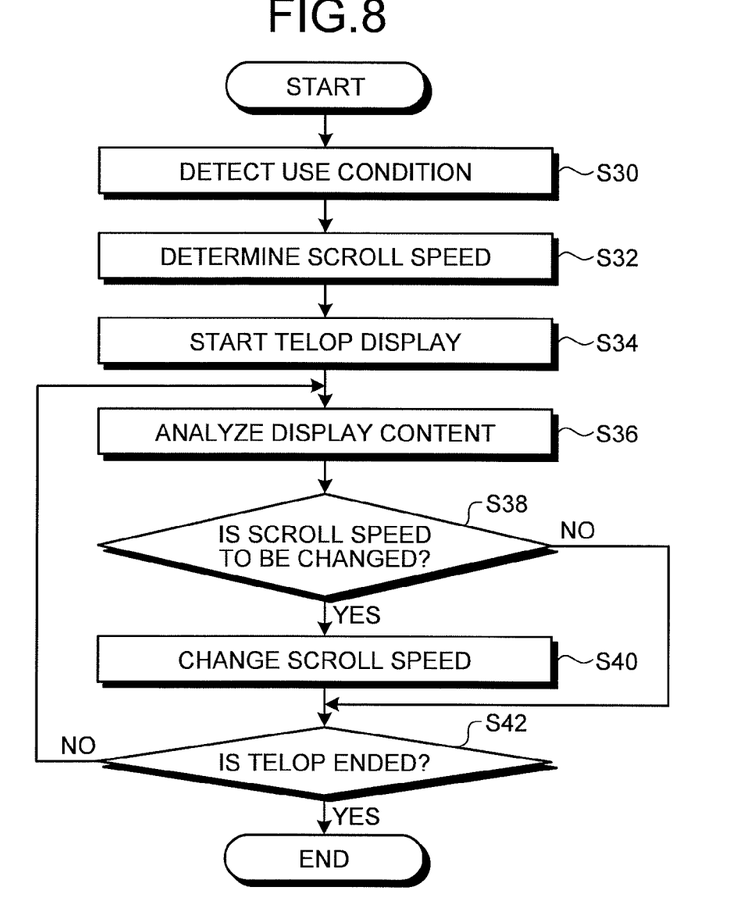
FIG. 8 is a flowchart illustrating an example of processing of the information display device.

In the above-described embodiment, the scroll speed is determined based only on the visual line position detected by the camera. However, the present invention is not limited thereto. Another example of the processing of the information display device 1 will be described below with reference to FIGS. 7 and 8. FIG. 7 is an explanatory view illustrating an example of the information stored in the condition table 24*d*. FIG. 8 is a flowchart illustrating an example of the processing of the information display device 1.

As described above, in the condition table 24*d*, various conditions can be stored as the information for controlling the scroll speed. For example, as illustrated in FIG. 7, time information such as morning and afternoon and conditions of a configuration (a ratio of Katakana characters) of the displayed information are correlated with an adjustment value (setting) of the scroll speed in the condition table 24*d*. In Japanese, text information is formed with various types of characters such as Kanji, Hiragana, Katakana, alphabet, number, and the like. The type of character used for the condition to adjust/determine the scroll speed is not limited to Katakana, therefore any types of characters can be used.

The control unit 22 can also set the scroll speed using a use condition and a correspondence relationship stored in the condition table 24*d*. An example of the processing will be described with reference to FIG. 8. The control unit 22 detects the use condition at Step S30. When the scroll speed is switched based on whether current time is in the morning or in the afternoon as illustrated in FIG. 7, the control unit 22 acquires the current time as the use condition to determine the scroll speed. When the reference scroll speed is adjusted using the sample information as described above, the control unit 22 scrolls the sample information in the scroll region 50 to detect the visual line position of the operator as the use condition.

Following the detection of the use condition at Step S30, the control unit 22 determines the scroll speed at Step S32.

When the scroll speed has been determined at Step S32, the control unit 22 starts the telop display at Step S34. That is, the control unit 22 starts the scroll display of the information in the scroll region 50. After starting the telop display at Step S34, the control unit 22 analyzes display contents, namely, contents of the information displayed in the scroll region 50, at Step S36. For example, the control unit 22 analyzes the ratio of the Katakana characters and a ratio of proper names, which are displayed in the scroll region 50. An analysis target of the present embodiment is a portion displayed in the scroll region 50 in the information. The whole information may be previously analyzed such that the analysis result can be retained during the scroll thereof. For example, through the analysis, the control unit 22 determines that the scroll speed should be decelerated by 10% when the ratio of the Katakana characters in the portion being displayed in the scroll region 50 changes from 0% to 30%.

Following the analysis on the display contents at Step S36, the control unit 22 determines whether the scroll speed is to be changed at Step S38. When it is determined that the scroll speed is not to be changed at Step S38 (No), the control unit 22 goes to Step S42. When it is determined that the scroll speed is to be changed at Step S38 (Yes), the control unit 22 changes the scroll speed at Step S40. Then the control unit 22 goes to Step S42.

When it is determined to be No at Step S38, or when the processing at Step S40 is executed, the control unit 22 determines whether the telop is to be ended at Step S42. When it is determined that the telop is not to be ended at Step S42 (No), the control unit 22 goes to Step S36 to repeat the above pieces of processing. When it is determined that the telop is to be ended at Step S42 (Yes), the control unit 22 ends the processing.

In the information display device 1, the reference scroll speed previously calculated using the sample is adjusted based on various conditions, which allows the information to be displayed at the scroll speed suitable for the display contents or the use condition. Through the adjustment of the scroll speed by this method, the information can be displayed in the scroll region 50 in a manner where the user easily reads and recognizes the information.

Preferably the information display device 1 executes the control illustrated in FIG. 6 and the control illustrated in FIG. 8 in combination. That is, preferably the scroll speed is adjusted based on the visual line position while adjusted based on the display condition. Therefore, the information can be displayed in the scroll region 50 in a manner where the user more easily reads and recognizes the information.

In the example of FIG. 7, the scroll speed for the afternoon is slower than that for the morning in the setting of the scroll speed. Alternatively, the user may properly set the conditions. For example, the sample information is displayed under various conditions to make an adjustment for the calculation of the scroll speed on the conditions, and the adjustment amount may properly be calculated based on each of the conditions. The condition may be set according to an age of the user. For example, the scroll speed in the afternoon may be slower than in the morning for an old person, and scroll speed in the morning may be slower than in the afternoon for a young person. A scroll speed changing pattern, such as a pattern in the morning and in the afternoon, is provided according to a characteristic of human concentration and a time change, thereby allowing the scroll speed to be controlled according to the actual life.

The scroll speed is controlled based on the ratio of the Katakana characters or the ratio of the proper nouns, thereby allowing the scroll speed to be adjusted based on the existence or non-existence of the words, such as the proper nouns and the Katakana characters, which may cause a user to take a longer time to read. More specifically, the scroll speed is selectively decelerated in the case of many words that may cause a user to take a longer time to read, whereby easiness of read can be improved even if the total scroll speed is not decelerated. In the above-described embodiment, ratio of the Katakana characters or the proper nouns is used as the condition. Alternatively, a ratio of English characters or a ratio of signs may be used. In the embodiment, the scroll speed is decelerated. However, the invention is not limited thereto. The control unit 22 may accelerate the scroll speed when a ratio of easy-to-read characters (such as adjectives and verbs) included in the information is higher.

The use condition is not limited to the above time of the day and the ratio of the Katakana characters. For example, a function of a pedometer may be implemented using the acceleration sensor 38 to detect a walking speed and a walking pace of the user so that the walking speed and the walking pace can be used as the use condition. For example, it is determined that the user is the old person when the walking pace is slow, and the scroll speed may be decelerated. The scroll speed may be decelerated when it is determined that the user is walking, and the scroll speed may be accelerated when it is determined that the user stops.

Not only the state during the scroll display but also the state during the use of the information display device 1 may be used as the use condition. That is, various states during the use of the information display device 1 are detected, and a user's characteristic (such as an age, a sex, and a level of skill of usage) may be used as the use condition. Sound information acquired by the microphone 15 may be used as the use condition as well as the information acquired by the acceleration sensor 38. For example, whether the user is the old person may be determined based on a conversation speed or characteristics of voice.

Alternatively, for example, an optical sensor that detects brightness is mounted on the information display device, the scroll speed may be accelerated when the detection result of the optical sensor is indicative of being bright, and the scroll speed may be decelerated when the detection result of the optical sensor is indicative of being dark.

When the control unit 22 repeatedly displays the information in the scroll region, preferably the scroll speed of the information is accelerated as the number of display times of the information increases. Therefore, the frequently-displayed information can be displayed for a shorter time. An upper limit is provided in the scroll speed, and the scroll speed may be set so as not to be faster than the upper limit when the number of display times of the information exceeds a given value. The scroll speed may be changed in a stepwise manner. For example, 10 times, 20 times, and 30 times are used as a threshold, and the scroll speed may be accelerated when exceeding the number of times in the threshold.

When a portion in which the visual line positions detected by the camera (visual line detector) 40 are overlapped at least predetermined times exists in the information, preferably the control unit 22 decelerates the scroll speed while the portion is displayed. Specifically, the control unit 22 accumulates information indicating that the visual line position is located in each portion of the information, and the scroll speed is decelerated compared with other portions when the portion, in which the visual line position is located predetermined times or more, is displayed. Because the portion in which the visual line position is located predetermined times or more, namely, the portion that is viewed longer than other portions by the user is a watched portion or a portion that takes a longer time to read or recognize, the watched portion or the portion that takes a longer time to read or recognize can slowly be read and recognized by decelerating the scroll speed. Therefore, the user can easily read and recognize the information.

The control unit 22 includes a character controller 44 that controls a size of the information based on the visual line position detected by the camera (visual line detector) 40. When the portion in which the visual line positions detected by the camera (visual line detector) 40 are overlapped at least predetermined times exists in the information, preferably the character controller 44 displays the portion by a display form different from that of other portions. The portion in which the visual lines are overlapped, namely, the watched portion or the portion that takes a longer time to read or recognize is displayed by the different display form, so that the user can easily read and recognize the information. In this case, the portion is displayed with larger characters compared with other portions. Therefore, with the larger characters, the user can easily read and recognize the information. The manner for changing the display form is not limited to the present embodiment, but the portion may be shown with bold types, a color of the portion may be changed, or the portion may be superimposed by a fluorescent marker. The character controller 44 that controls the size or the color of the information may not be provided in the control unit 22, but may separately be provided.

Figure 9:
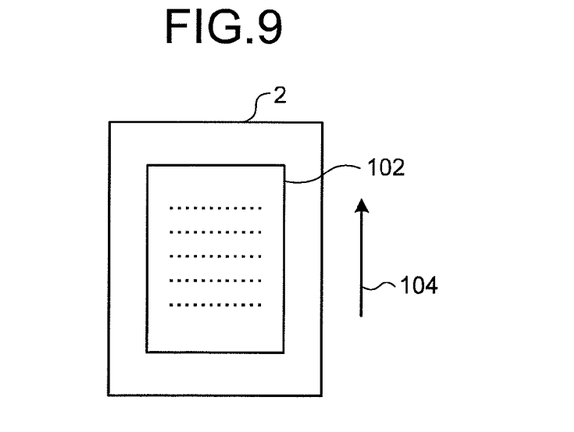
FIG. 9 is an explanatory view illustrating another example of the image displayed by the information display device.

FIG. 9 is an explanatory view illustrating another example of the image displayed by the information display device. In the above-described embodiment, the pieces of information are displayed in line in the scroll region 50. However, the invention is not limited to the embodiment. The information display device 1 may display the information in the scroll region while unidirectionally moving the information at the scroll speed that is set in the scroll region. For example, as illustrated in FIG. 9, pieces of information of plural rows are displayed in a scroll region 102 of the display 2, and the pieces of information may be scrolled in a direction of an arrow 104 that is orthogonal to the row direction. That is, similarly to credits of a movie, the scroll direction may be set to the direction orthogonal to direction in which the characters are arrayed. In this case, the same effect as the above can also be obtained by adjusting the scroll speed based on the visual line position in the direction parallel to the scroll direction.

In the above-described embodiment, the camera program 24a, the screen control program 24b, and the scroll control program 24c are separately installed. However, the invention is not limited thereto. For example, the screen control program 24b and the scroll control program 24c may be combined into one program, or the camera program 24a, the screen control program 24b, and the scroll control program 24c may be combined into one program.

In the above-described embodiment, the camera 40 captures the image to detect the visual line position. However, the visual line detection method is not limited thereto. For example, a sensor (such as an infrared sensor) except the camera 40 may detect the movement of the user's eyes to detect the visual line position.

The advantages are that one embodiment of the invention and a scroll control method allows a user to read and recognize the displayed information easily.

What is claimed is:
1. An information display device, comprising:
a display unit configured to display information in a scroll region, which is provided in at least a part of a screen of the display unit, while scrolling the information;

a visual line detector configured to detect a visual line position of a user of the information display device with respect to the scroll region;

a control unit configured to control a scroll speed, at which the information is scrolled in the scroll region, based on the visual line position detected by the visual line detector; and an acceleration sensor configured to detect an acceleration applied to the information display device;

wherein upon a determination, based on the acceleration detected by the acceleration sensor, that the user of the information display device is walking, the control unit is configured to decelerate the scroll speed, and continue to scroll the information at the decelerated scroll speed which is greater than zero, wherein upon a determination, based on the acceleration detected by the acceleration sensor, that the user of the information display device stops, the control unit is configured to accelerate the scroll speed, and wherein the accelerated scroll speed upon the determination that the user stops is faster than the decelerated scroll speed upon the determination that the user is walking.

2. The information display device according to claim 1, wherein the visual line detector is configured to detect the visual line position at set intervals, and the control unit is configured to scroll the information at the scroll speed, at which the visual line position is maintained in a region, based on the visual line positions that are detected plural times by the visual line detector.

3. The information display device according to claim 2, wherein the region is a central region of the scroll region.

4. The information display device according to claim 1, wherein the scroll region includes a region, and the control unit is configured to accelerate the scroll speed of the information when the visual line position is closer to a scroll display starting position side than the region, and to decelerate the scroll speed of the information when the visual line position is closer to a scroll display ending position side than the region.

5. The information display device according to claim 1, wherein the display unit is configured to scroll sample information in the scroll region, and the control unit is configured to determine a reference scroll speed of the information based on the visual line position of the user with respect to the sample information detected by the visual line detector, and to set the scroll speed to the reference scroll speed at a beginning of displaying the information in the scroll region.

6. The information display device according to claim 1, wherein the control unit is configured to repeatedly display the information, and to increase the scroll speed of the information as the number of display times of the information increases.

7. The information display device according to claim 6, wherein, the control unit is configured to decelerate, when the information includes a portion in which the visual line positions detected by the visual line detector are overlapped at least given times, the scroll speed while the portion is displayed.

8. The information display device according to claim 6, further comprising a character controller configured to change, when the portion in which the visual line positions detected by the visual line detector are overlapped at least predetermined times exists in the information, a display form of the portion to be different from that of other portions of the information.

9. The information display device according to claim 8, wherein the character controller is configured to display the portion with larger characters compared with the other portions.

10. The information display device according to claim 1, further comprising:

a visual line determination unit configured to determine a position of a block including the visual line position detected by the visual line detector, out of a plurality of blocks into which a range where the visual line detector detects the visual line is divided, wherein, the control unit is configured to control the scroll speed based on the position of the block including the visual line position determined by the visual line determination unit.

11. A scroll control method executed by a device that includes a display unit for displaying information, and a detector for detecting a visual line position of a user of the device, and an acceleration sensor for detecting an acceleration applied to the device, the scroll control method comprising:

scrolling information in a scroll region of the display unit;

detecting the visual line position with respect to the scroll region by the detector;

controlling a scroll speed, at which the information is scrolled in the scroll region, based on the visual line position detected by the detector;

decelerating the scroll speed but without stopping scrolling the information upon a determination, based on the acceleration detected by the acceleration sensor, that the user of the device is walking; and accelerating the scroll speed upon a determination, based on the acceleration detected by the acceleration sensor, that the user of the device stops, wherein the accelerated scroll speed upon the determination that the user stops is faster than the decelerated scroll speed upon the determination that the user is walking.

12. The method of claim 11, further comprising:

in response to a key operated by the user, accelerating the scroll speed.

13. The method of claim 11, further comprising:

in response to a key operated by the user, feeding the information displayed in the scroll region by a length.

14. The method of claim 11, further comprising:

storing a plurality of different scroll speed settings and a plurality of corresponding conditions, wherein said controlling comprises, when one among the plurality of stored conditions is met, controlling the scroll speed in accordance with the stored scroll speed setting corresponding to the detected condition.

15. The method of claim 14, wherein the plurality of conditions includes various times in a day.

16. The method of claim 14, wherein the plurality of conditions includes various types of characters of the information displayed in the scroll region.

17. The method of claim 11, further comprising:

analyzing contents of the information displayed in the scroll region;

based on a result of the analyzing, determining whether the scroll speed is to be changed; and changing the scroll speed upon a determination that the scroll speed is to be changed.

18. The method of claim 15, further comprising:
detecting an age of the user,
wherein
when the detected age of the user is a first age, the scroll speed set by a stored scroll speed setting corresponding to a first time of the day is slower than the scroll speed set by a stored scroll speed setting corresponding to a second time of the day, and
when the detected age of the user is a second age, the scroll speed set by a stored scroll speed setting corresponding to the first time of the day is faster than the scroll speed set by a stored scroll speed setting corresponding to the second time of the day.

19. The method of claim 18, wherein
the first age is higher than the second age,
the first time of the day is in the afternoon, and
the second time of the day is in the morning.

20. The method of claim 18, further comprising:
detecting, using the acceleration sensor, a walking pace of the user,
wherein the age of the user is detected based on the detected walking pace of the user.

\* \* \* \* \*